United States Patent
Pestow, Jr. et al.

(10) Patent No.: US 6,920,367 B2
(45) Date of Patent: *Jul. 19, 2005

(54) MANUFACTURING OPTIMIZATION AND SYNCHRONIZATION PROCESS

(75) Inventors: Charles A. Pestow, Jr., Cedar Park, TX (US); Glenn Elkins, Round Rock, TX (US); James Anthony Finegan, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/850,708

(22) Filed: May 21, 2004

(65) Prior Publication Data

US 2004/0225395 A1 Nov. 11, 2004

Related U.S. Application Data

(63) Continuation of application No. 10/200,989, filed on Jul. 23, 2002, now Pat. No. 6,741,902.

(51) Int. Cl.[7] .......................... G06F 17/60; G06F 19/00
(52) U.S. Cl. .......................... 700/101; 700/28; 700/95; 700/102; 700/115; 705/28
(58) Field of Search ............................ 700/95, 99–102, 700/115, 216; 705/8, 28, 29

(56) References Cited

U.S. PATENT DOCUMENTS

| | | | |
|---|---|---|---|
| 5,712,989 A | 1/1998 | Johnson et al. | 395/228 |
| 5,860,068 A | 1/1999 | Cook | 705/26 |
| 5,946,662 A | 8/1999 | Ettl et al. | 705/8 |
| 5,983,195 A | 11/1999 | Fierro | 705/10 |
| 5,998,853 A | 12/1999 | Sugasawara | 257/529 |
| 6,092,000 A | 7/2000 | Kuo et al. | 700/115 |
| 6,151,582 A | 11/2000 | Huang et al. | 705/8 |
| 6,236,901 B1 | 5/2001 | Goss | 700/95 |
| 6,365,861 B1 | 4/2002 | Beffa | 209/573 |
| 6,463,420 B1 | 10/2002 | Guidice et al. | 705/28 |
| 2002/0103725 A1 | 8/2002 | Martin et al. | 705/28 |

*Primary Examiner*—Jayprakash N. Gandhi
(74) *Attorney, Agent, or Firm*—Baker Botts L.L.P.

(57) ABSTRACT

A manufacturing optimization and synchronization process is provided in which data records for incomplete orders in the manufacturing and shipping facility are collected and sorted on a priority basis such that orders that have the fewest number of incomplete orders and that have the most total number of units ordered have the highest priority in the sorting process. This data is then displayed for the users on a real-time basis to identify those orders that, when completed, will have the greatest effect on the throughput and efficiency of the manufacturing and shipping process.

20 Claims, 5 Drawing Sheets

PN2 Out of Lead (OOL) Report

Last Updated 05/01/2002 3:00:02 PM

Select *STT Management* to keep focus on order age. Select *WIP Management* to reduce WIP the quickest. SST sorts time since TP descending then number missing, then order size descending. WIP sorts number missing, then order size descending, then time since TP descending.

*Default: ● STT Management / ○ WIP Management

| Order Number | Service Tag | Line | Order/Track Code Information 34 | | | | | Comments |
|---|---|---|---|---|---|---|---|---|
| All ▾ 50 | All ▾ 52 | All ▾ | TTL Missing from Order 56 | Total 58 | Last Route 60 | Age | Age Since TP 62 | Shifts OOL 64 |

Total Records Found: 1154

| Order Number | Service Tag | Line | TTL Missing from Order | Total | Last Route | Age | Age Since TP | Shifts OOL | Misc Information Comments |
|---|---|---|---|---|---|---|---|---|---|
| | | | | | | (Hours:Minutes) | | | |
| 823411152 | 3DJ7G11 | L2-EMR 2-B | 1 | 48 | 5465 | 18:18 | 25:41 | 2.1 | The DC could ship an additional 5085 systems when these 1156 orders arrive |
| 827229071 | C5L8G11 | L3-Q1-D | 1 | 48 | 5500 | 18:13 | 20:15 | 1.7 | |
| 826889818 | HG99G11 | L3-Q4-C | 1 | 48 | 6100 | 01:16 | 16:51 | 1.4 | |
| 823250774 | FKL9G11 | L1-Q1-D | 1 | 48 | 5400 | 14:44 | 15:29 | 1.3 | |
| 826892754 | HFQ9G11 | L3-Q4-B | 1 | 48 | 5500 | 04:35 | 14:54 | 1.2 | |
| 824492862 | C1Q9G11 | L1-Q2-C | 1 | 48 | 5450 | 07:04 | 14:47 | 1.2 | |
| 828604595 | DRT9G11 | L3-Q2-A | 1 | 48 | 5400 | 01:29 | 14:45 | 1.2 | |
| 828604850 | BFY9G11 | L2-Q2-C | 1 | 48 | 5450 | 04:24 | 14:06 | 1.2 | |
| 828605030 | 9VY9G11 | L3-Q4-C | 1 | 48 | 5400 | 01:25 | 14:01 | 1.2 | |
| 828604942 | 6H0BG11 | L3B | 1 | 48 | 5200 | 07:57 | 13:32 | 1.1 | |
| 823691464 | D2N9G11 | L2-Q4-D | 1 | 47 | 5400 | 14:33 | 15:06 | 1.3 | |
| 825562598 | D2S9G11 | L2-Q5-B | 1 | 45 | 5450 | 07:13 | 14:37 | 1.2 | |

PN2 Out of Lead (OOL) Report

Home Page > OOL Report

Last Updated 05/01/2002 3:00:02 PM

*Default:
- ● SST Management — Select *SST Management* to keep focus on order age. Select *WIP Management* to reduce WIP the quickest. SST sorts time since TP descending, then number missing, then order size descending. WIP sorts number missing, then order size descending, then time since TP descending.
- ○ WIP Management

| Order Number | Service Tag | Line | TTL Missing from Order | Total | Last Route | Age | Age Since TP | Shifts OOL | Comments |
|---|---|---|---|---|---|---|---|---|---|
| All ▾ | All ▾ | All ▾ 34 | | 58 | All ▾ 60 | 62 | 64 | | |

50 — Order/Track/Code Information 56 — (Hours:Minutes) — Misc Information

| Order Number | Service Tag | Line | TTL Missing from Order | Total | Last Route | Age | Age Since TP | Shifts OOL | Comments |
|---|---|---|---|---|---|---|---|---|---|
| Total Records Found: 1154 | | | | | The DC could ship an additional 5085 systems when these 1156 orders arrive | | | | |
| 821473113 | 56R2G11 | L1-Q2-B | 1 | 30 | 5400 | 03:04 | 52:16 | 4.4 | |
| 825729072 | 78M5G11 | NA | 3 | 31 | 7100 | 23:03 | 37:32 | 3.1 | |
| 825729072 | 3HM5G11 | NA | 3 | 31 | 7100 | 23:03 | 37:31 | 3.1 | |
| 827449570 | 7YP5G11 | L3B | 1 | 16 | 5200 | 37:02 | 37:17 | 3.1 | |
| 824213508 | 5FT5G11 | L1-Q4-A | 1 | 10 | 5400 | 07:12 | 36:30 | 3.0 | |
| 824148951 | 4626G11 | L1B | 1 | 15 | 5200 | 32:16 | 32:43 | 2.7 | |
| 827108010 | 9796G11 | L2-Q2-C | 1 | 15 | 5400 | 04:04 | 31:58 | 2.7 | |
| 825599160 | G1Q6G11 | NA | 3 | 15 | 7100 | 22:51 | 29:51 | 2.5 | |
| 827179318 | DHZ6G11 | L1-EMR 6-A | 1 | 10 | 5200 | 02:44 | 25:50 | 2.4 | |
| 827626078 | JTD7G11 | L5 | 1 | 15 | 5700 | 21:36 | 27:04 | 2.3 | |
| 823106059 | 1XD7G11 | L2-Q2-A | 1 | 20 | 5400 | 02:43 | 26:45 | 2.2 | |
| 824144364 | D4J7G11 | L1B | 1 | 20 | 5200 | 25:14 | 25:42 | 2.1 | |

FIG.5

MANUFACTURING OPTIMIZATION AND SYNCHRONIZATION PROCESS

CROSS-REFERENCE TO RELATED APPLICATION

This application is a continuation of application Ser. No. 10/200,989, filed Jul. 23, 2002, now U.S. Pat. No. 6,741,902 which is incorporated herein by reference.

TECHNICAL FIELD

The present disclosure relates generally to the field of manufacturing, and, more particularly, to a system and method for synchronizing and optimizing a manufacturing process.

BACKGROUND

Products, including computer systems or any other information handling system, can be manufactured according to a build-to-stock or a build-to-order manufacturing process. A build-to-stock manufacturing model is characterized by the manufacture of quantities of identical products on the basis of forecasted demand. A build-to-order manufacturing process is characterized by the manufacture of the computer system or other product, only after the time that an order is received for the product. A build-to-order manufacturing process facilitates the manufacture of customized products in response to customer orders and reduces inventory requirements, as the products, once manufactured, may be shipped directly to the customer. A build-to-order manufacturing process is described in U.S. Pat. No. 6,236,901, which is incorporated herein by reference in its entirety.

Most manufacturing environments include a manufacturing facility and a shipping facility. In some manufacturing environments, the manufacturing facility is integrated with the shipping facility as part of a single physical facility. Once the manufacture of the product is complete, the product is shipped to the customer. Larger orders received from a single customer are typically divided into lots for the purpose of tracking the order, and manufacturing and shipping the order. Typically, there is a maximum number of ordered units per lot. One example of the maximum number of units in a lot may be fifty units. If the total number of units ordered is less than fifty, the lot size for the unit is the number of units ordered. As an example if a customer orders 100 units, the order will be divided into two lots of 50. If the customer orders ten units, the order will have a single lot of ten units. In this manufacturing scheme, only completed lots will be shipped to the customer. If a fifty-unit lot of 200 unit order is complete, the lot may be shipped to the customer. If a ten-unit lot of a ten-unit order is complete, the lot, which comprises the entire order, can be shipped to the customer. In contrast, even if forty-nine units of a fifty-unit lot are complete, the incomplete lot is not shipped to the customer until the manufacture of the final unit of the lot is complete.

The shipping of an incomplete lot, sometimes referred to as short-shipping, adds an undesirable administrative burden to the shipping and order fulfillment process. This administrative burden is magnified when the manufacturing process involves the manufacture of thousands of customized units each day to a multitude of customers. To accomplish short-shipping in this environment, the customer order would have to be subdivided into one or more smaller orders. In addition, customers are accustomed to receiving all ordered units at once or receiving ordered units in large lots (of fifty units, for example) for large-unit orders. Shipping incomplete lots or incomplete orders to customers tends to create customer confusion, as the number of units received does not match the number of units ordered. In contrast, shipping complete lots, which sometimes comprise complete orders in and of themselves, is an aid to the throughput of the manufacturing and shipping process.

The throughput of the entire manufacturing process may be compromised by the accumulation of incomplete lots in the shipping facility. In the example of the fifty-unit lot in which forty-nine units are complete, the completed units will typically be placed in the shipping facility or warehouse. Depending on the physical characteristics of the units, these units may consume a substantial amount of floor space in the shipping facility. If a sufficient number of incomplete, space-consuming lots accumulate in the shipping facility, the operation of the shipping facility is hindered. If these incomplete lots are not completed, thereby allowing the completed lots to ship to the customer, all of the available storage space in the shipping facility will eventually be consumed by incomplete lots. When this condition occurs, the entire manufacturing process itself may shut down. Because it is no longer possible to store completed units, no more units can be manufactured until space becomes available to temporarily house completed units. In addition, because each completed order must pass through the shipping facility, if only briefly, each order that is in process in the manufacturing facility must be allocated space in the shipping facility during the time that the product is being manufactured. The allocation of space, even if the space is not used, to in-process orders further contributes to the consumption of space in the shipping facility.

Often, the accumulation of incomplete lots in the shipping facility is exacerbated by the manufacturing priority of completing the manufacturing of aged orders versus the shipping priority of shipping large lot orders to clear storage space in the shipping facility. In many manufacturing environments, the products are manufactured in build cells. Typically, an order of fifty units will not be completed in a single build cell. Instead, the order will be completed in parallel across several build cells, with each build cell completing not more than a handful of the units of the order. A goal of manufacturing is the completion of the oldest order, while the goal of a distribution process is to ship those lots that are nearest to completion and that are consuming space in the shipping facility. Consider the example of two orders of fifty units each and assume that the normal process time for the completion of each order is ten hours. The first order (Order A) is complete with the exception of one unit and has an order age of just two hours. As such, forty-nine units of Order A are in the shipping facility and will ship once the last unit of Order A is complete. The second order (Order B) includes twenty-five complete units and twenty-five incomplete units. Order B has an order age of twenty hours. Because it is often a goal of manufacturing to complete the order having the oldest order age, the manufacturing personnel may place a priority in completing Order B before Order A. Although, completing Order B before Order A will permit manufacturing to clear from its record an aged order, the failure to complete Order A will prevent a nearly complete order from shipping. Preventing nearly complete Order A from shipping will cause the completed units of Order A to consume space in the shipping facility and reduce the rate of overall throughput of the manufacturing and shipping process.

SUMMARY

In accordance with the present disclosure, a method and system is provided for optimizing and synchronizing the throughput of a manufacturing and shipping facility. Data concerning incomplete orders is collected and sorted, with each order or lot representing a separate data record. The data records are sorted according to the data in the record on a priority basis. The data records are first sorted by orders having the fewest number of incomplete units on an ascending basis. As a second priority, the data records are sorted according to the largest number of total units in the order or lot on a descending basis. As a third priority, the data records are sorted according to the age of the order on a descending basis. The data records are then displayed on a real-time basis on an Internal web server or computer system, such as a company Intranet.

At least one technical advantage of the present disclosure is a method for identifying incomplete orders in the manufacturing facility that most affect the throughput of the manufacturing and shipping operations. By identifying those orders that have the fewest number of incomplete units and that also have the highest number of units in the order, the manufacturing facility can complete those orders that will free the most allocated space in the shipping facility. Another technical advantage of the present invention is a method for identifying the status of incomplete orders in a manufacturing facility on a real-time basis. The data concerning the incomplete orders is collected from a manufacturing database and a shipping database. Once this data has been collected, organized, and sorted, it is displayed on a company Intranet or internal web site. Simply by refreshing the displayed web page, the data, and thereby the status of the manufacturing process, can be displayed almost instantly, allowing personnel to identify those incomplete units that most affect the throughput of the manufacturing process. Another technical advantage of the present disclosure is that the technique disclosed herein permits the manufacturing process to operate in an environment in which the goal of the manufacturing process—the completion of all orders in a timely manner—is aligned with the goal of the distribution process—shipping those orders that consume the most space in the shipping facility. The separate goals are aligned by identifying for the manufacturer those orders that, when completed, will have the greatest impact on the manufacturing facility and the shipping facility. These identified orders, when completed, will both leave the manufacturing facility and clear allocated space in the shipping facility. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The present disclosure concerns a method for optimizing the manufacture of units in a manufacturing location and the shipment of those units from a shipping location. The present disclosure permits the content of unshipped units in the shipping facility to be associated and optimized with incomplete units in the manufacturing facility. The present disclosure describes a method of collecting and sorting data that identifies for the manufacturer those incomplete or unmanufactured units that are most likely to interfere with the throughput rate of the manufacturing process. The sorting process of the present disclosure likewise identifies those unmanufactured units that, if completed, would aid the throughput of the manufacturing and shipping process.

Figure 1:
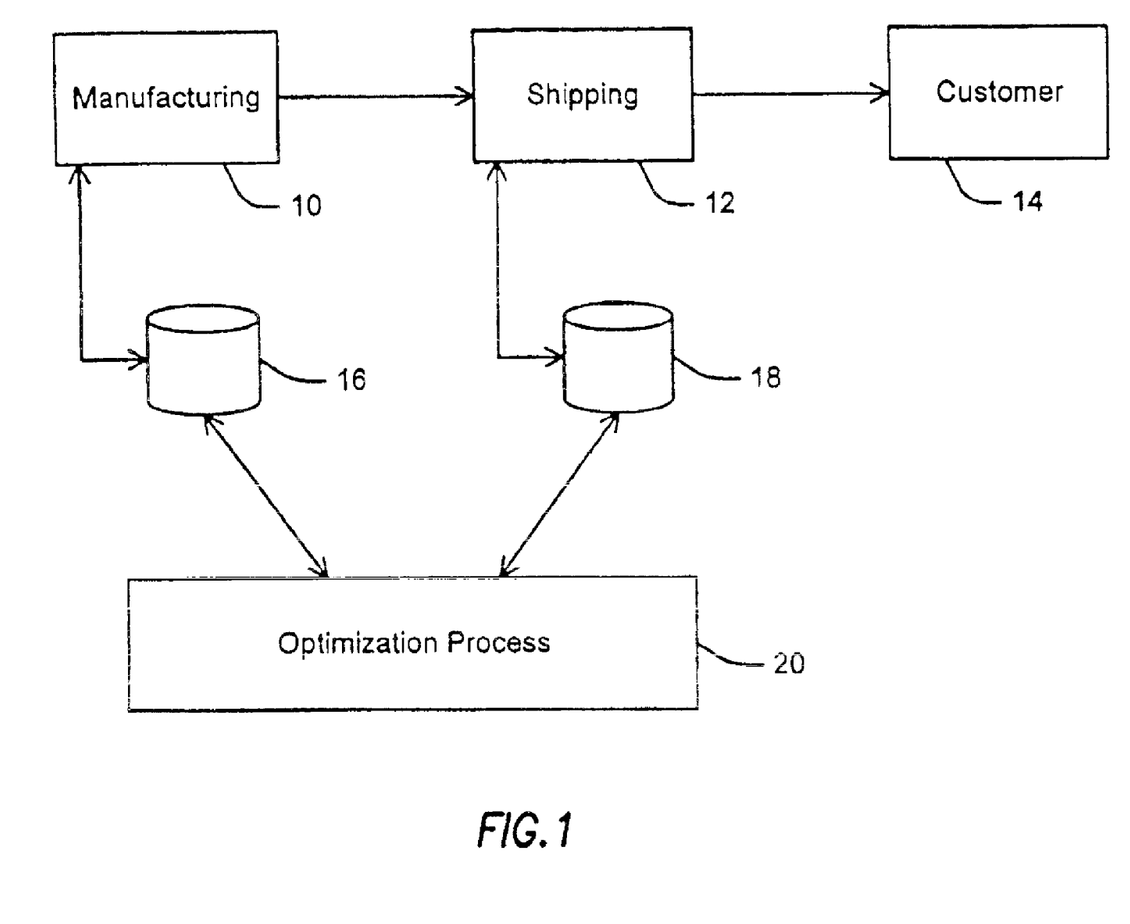
FIG. 1 is a flow and logic diagram of the manufacturing, shipping, and information flow in a manufacturing environment.

Shown in FIG. 1 is a flow and logic diagram of the manufacturing, shipping, and information flow in a manufacturing environment. As indicated in FIG. 1, following the manufacture of products at a manufacturing facility 10, products travel to a shipping facility 12, where they are collected and shipped to a customer 14. Manufacturing facility 10 and shipping facility 12 may occupy the same physical space. Information concerning the status of the manufacturing process, including information concerning the status of orders is collected and placed in a database 16. Information concerning the status of the shipping or distribution process is collected and placed in a database 18. The optimization process 20 of the present disclosure collects data from the manufacturing database 16 and the shipping database 18.

Figure 2:
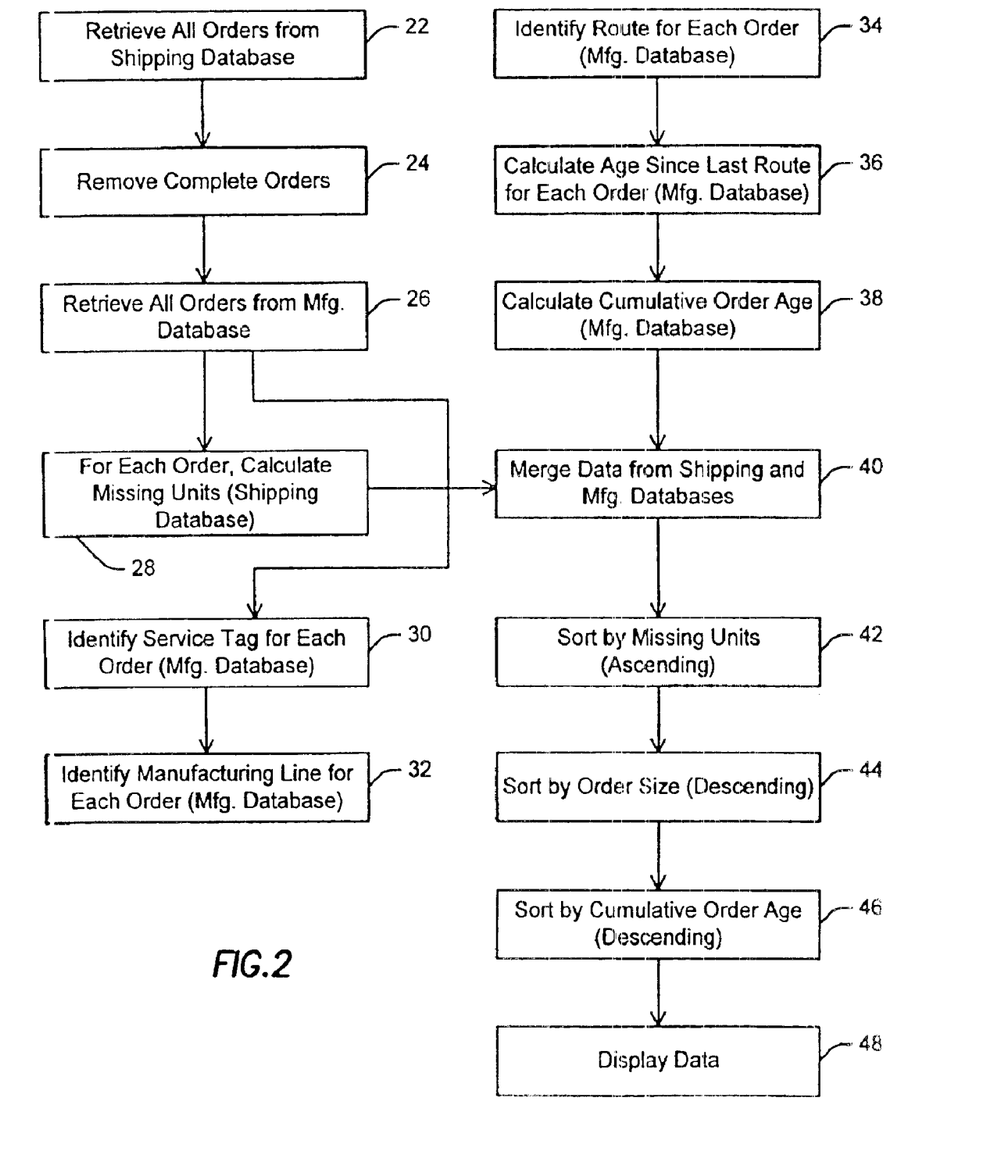
FIG. 2 is a flow diagram of a manufacturing and shipping optimization process.

Shown in FIG. 2 is a flow diagram of a manufacturing and shipping optimization process. At step 22, all available orders are retrieved from the shipping database, which is shown on FIG. 1 as database 18. Because shipped orders are limited in size to a lot of fifty units, the number of units in an order is limited to fifty units. Thus, even though a customer may order a number of units, the maximum number of units that comprise an "order" for the sake of the flow diagram of FIG. 2 is limited to a maximum number, one example of which is fifty units. At step 24, complete orders are filtered from the list of total orders. The filtering step of step 24 is necessary because shipping database 18 may include a listing of orders that are actually complete and will soon be shipped from the shipping facility. Because complete orders are ready to be shipped, these orders do not need to be optimized with respect to incomplete units in the manufacturing facility. At step 24, all orders are retrieved from the manufacturing database, which is shown on FIG. 1 as database 16. At step 26, using data from the shipping database, the number of missing units from each order is calculated. This figure is determined by subtracting the number of units of the order that have been collected in the shipping facility from the total number of units in the order.

The flow of the optimization process of FIG. 2 continues on parallel paths, using data from both shipping database 18 and manufacturing database 16. Along one parallel path, processing continues at step 30, where the service tag of each order is identified from the data in the manufacturing database. The service tag of an order is a code that identifies the units of the order for the sake of providing technical service to the order. At step 32, data from the manufacturing database is used to identify the manufacturing line of any incomplete units in the order. Because orders are typically divided among several manufacturing lines, it is possible that the incomplete units of an order will be located on more than one manufacturing line. At step 34, the route of each order is determined from data in the manufacturing database. The route of an order is the location of the order in the manufacturing process. In the case of the manufacture of a computer system, the route of an order describes the location or the manufacturing step of the unit under manufacture. As an example, in the case of the manufacture a computer system, the unit may be routed to initial assembly or the unit may be routed to electromagnetic testing. The route of a unit describes the manufacturing step for the unit. At step 36, the age since the last route of the unit is determined from data in the manufacturing database. The aging calculation of step 36 is calculation of the time that the unit has been in the current manufacturing station. At step 38, the cumulative age of the entire order is calculated from data in the manufacturing database.

At step 40, the data from the shipping database is combined with data from the manufacturing database. The data from each database is cross-referenced against each other according to the unique order number of each order, creating a data record for each order. Once the data for each order has been collected, the data records can be sorted. At step 42, the data records are first sorted on an ascending basis according to the number of incomplete units in each order. As an illustration, those orders that have only one unit that has not yet been manufactured will have priority in the sorting process as compared with those orders that have tens of units that have not yet been manufactured. At step 44, the data records are sorted on a descending basis according to order size. As a result of step 44, the largest orders that have the fewest incomplete items will have priority in the sorting process. The sorting of data records according to the number of incomplete units, on an ascending basis, and by the total order size, on a descending basis, illustrates that the optimization process seeks to identify those orders that are the largest and are nearest to completion. In this way, those orders that are the largest and nearest to completion can be identified, and completed, to clear space at the shipping facility. At step 46, the data records are sorted by the cumulative order age on a descending basis. As such, once the orders with the fewest incomplete units and the most units are identified, the records are sorted a third time to identify those units that are cumulatively the oldest units. The step of sorting by the oldest units demonstrates a policy towards identifying the oldest units, as judged by the cumulative order age. At step 48, the data is displayed.

Figure 3:
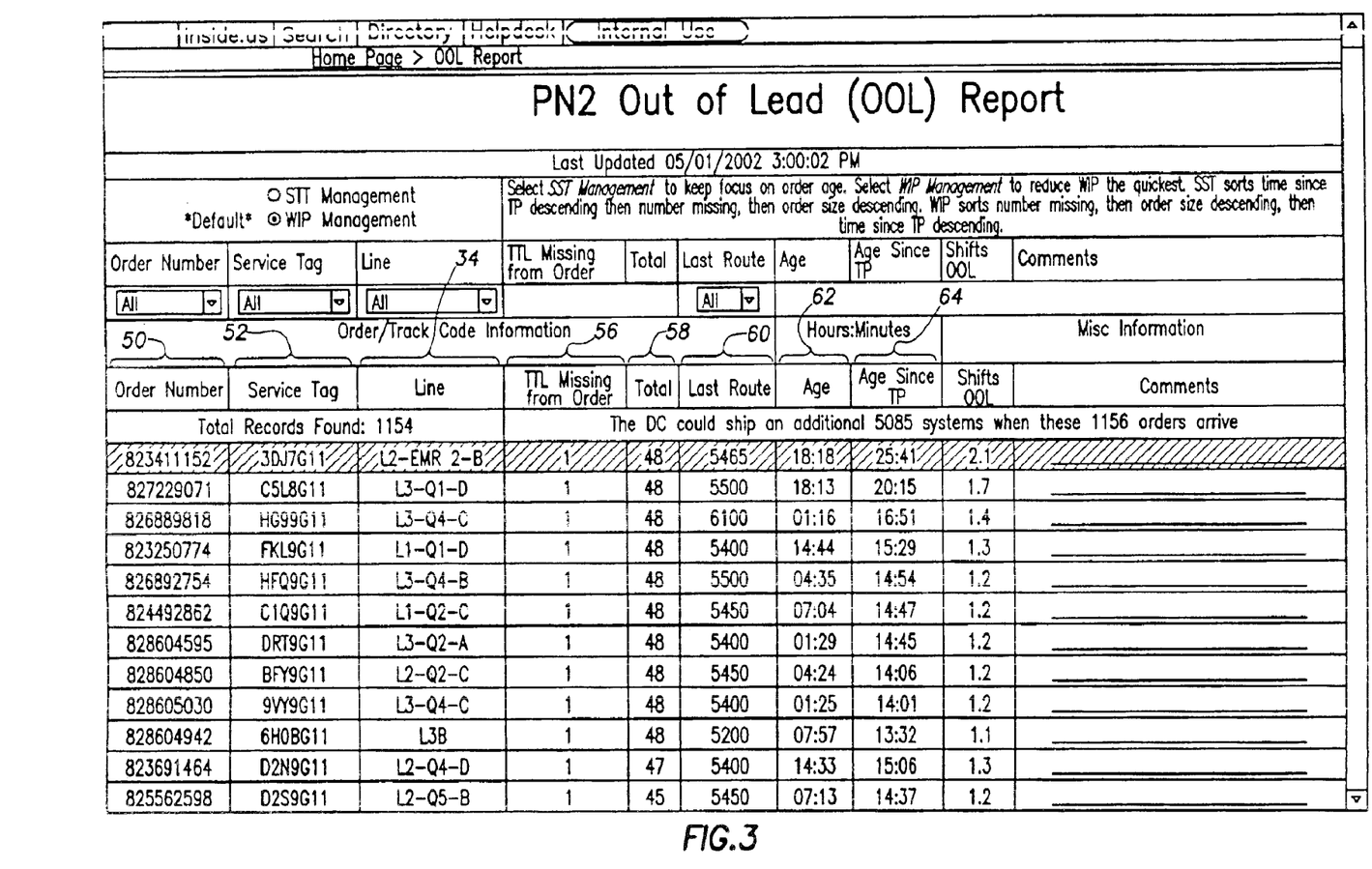
FIG. 3 is a displayed page of data that has been collected and sorted according to the flow diagram of FIG. 2.

Shown in FIG. 3 is a example of the data that has been collected and sorted according to the flow diagram of FIG. 2. On the left side of the columns of sorted data is the column labeled "Order Number," which is indicated at 50. The order number is the unique identifier for each order, with each order being limited to a maximum number of units. In the example of FIG. 3, the maximum number of units per order is fifty units. Column 52 of FIG. 3 is the service tag of each order. Column 54 of FIG. 3 is the manufacturing line of each order. Column 56 identifies the number of units missing from the order, i.e., the number of units that have not yet reached the shipping facility for bundling and shipment with the remainder of the units of the order. Column 56 is sorted by the number of missing units on an ascending basis. As such, the orders or data records that have the highest priority will be those that have the fewest number of missing units. Column 58 identifies the total items in the order. The records are secondarily sorted according to the total items in the order on a descending basis. As shown in FIG. 3, order number "828604942," which has one missing unit and forty-eight units in the order, has priority over order number "823691464," which has one missing unit and forty-seven units in the order.

The priority of the larger order over the smaller order, given the same number of missing units, reflects the goal of completing orders that free the most space in the shipping facility. Completing an order of forty-eight units will free more space than completing an order of forty-seven units or ten units. Column 60 identifies the last route or the most recent manufacturing location of the order. The four-digit identifiers in the column 60 represent codes that identify for the manufacturer the manufacturing station of the unit. If more than one unit is incomplete, the last route may be set as a default to identifying the last route or manufacturing location of the unit that is at the earliest stage in the manufacturing process. Column 62, which is titled "Age," represents the elapsed time of the unit in the current route or manufacturing station. Column 64, which is titled "Age since TP" is the age of the order since the time that the order was passed to manufacturing. The age of the order, as shown in column 64, is the third criteria for sorting. Sorting is done on a descending basis, thereby reflecting a priority for those orders that are the oldest among those orders having few units missing and a large number of total units.

The process of sorting the data identifies incomplete units in the manufacturing facility that, if left unfinished, are most likely to results in delays in the manufacturing process, and that, if finished, are most likely to free physical space at the shipping facility. FIG. 3 includes the legend, "The DC [shipping facility] could ship an additional 5085 systems when these 1156 orders arrive. As such, when the 1156 incomplete orders are completed, 5085 systems or units could leave the shipping facility. As it stands, however, the shipping facility must allocate physical space for 5085 systems or units. The process of collecting and sorting data from the manufacturing and shipping facility as described herein results in the identification of those incompletely manufactured units that, if completed, would have a significant impact on the throughput of the manufacturing and shipping process. The process described herein identifies those orders in manufacture that are few in number and that, if completed, would result in the largest number of units being shipped, with a tertiary preference for those orders that are the oldest in terms of cumulative age.

The data of the present invention can be updated on a real-time basis. The optimization application of the present invention may reside, for example, on a corporation's internal web server. Upon initiating the optimization application or hitting a refresh or reload key, data is retrieved from each of the manufacturing database and the shipping data. Following some calculation steps, the collected data is sorted and placed in table, as shown in FIG. 3. Refreshing the table causes the above-described process to be repeated, yielding real-time data that can be requested by any user of the optimization program. Because the optimization program can be made accessible through an Internal web site or Intranet, real-time data concerning the status of the manufacturing process and its related effect on the shipping process may be refreshed and viewed by any member of the management, manufacturing, or shipping staffs. As such, because of the sorting of records, manufacturing employees are able to quickly recognize when an incomplete unit in their area of responsibility is negatively affecting the throughput of the manufacturing and shipping process. Similarly, management employees are able to recognize when a line or manufacturing location is a consistent sources of delays in the manufacturing process.

Figure 4:
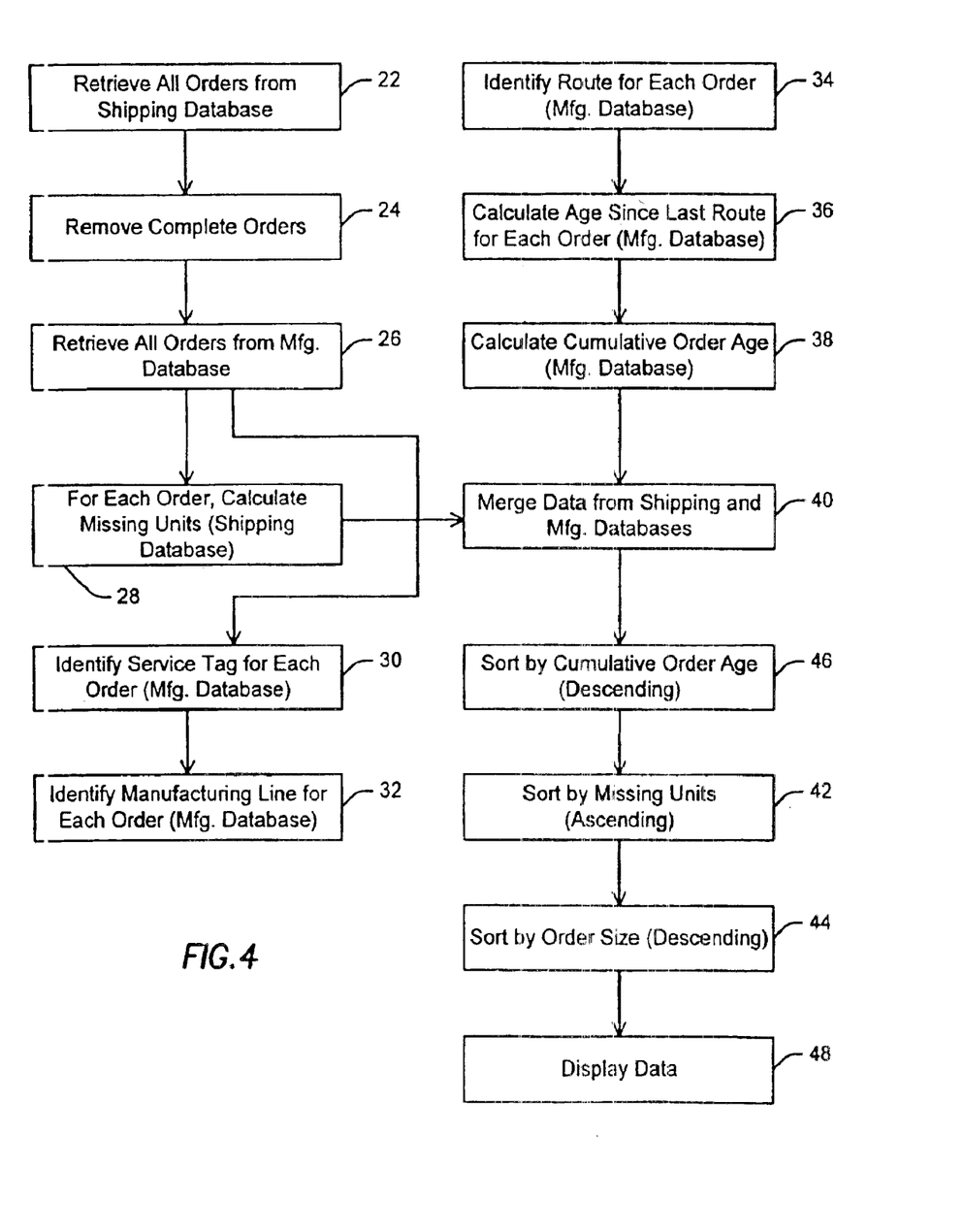
FIG. 4 is a flow diagram of a manufacturing and shipping optimization process.

In addition to the methodology for sorting records of the flow diagram of FIG. 2, other sorting methodologies may be performed on the merged data from the manufacturing database and the shipping database. Shown in FIG. 4 is a subset of the flow diagram of FIG. 2. Steps 22–38 are not shown in FIG. 4, as these steps are identical to the steps described above with respect to FIG. 2. Following the step of merging the data collected from the manufacturing database with data collected from the shipping database, the data records are sorted according to the steps shown in FIG. 4. The data is first sorted in step 46 by the cumulative order age of each order, on a descending basis. Placing order step 46 first assures that the oldest order will have priority in this sorting hierarchy. After step 46, the data records are sorted at step 48 according to the number of missing units in each order. The sort of step 46 is made on an ascending basis. Finally, at step 44, the data records are sorted on a descending basis according to the total number of units in the order. The sorting process of FIG. 4 assures that older orders will have first priority, followed by a priority weighting for orders with fewer number of incomplete orders, and orders with larger numbers of total units.

Figure 5:
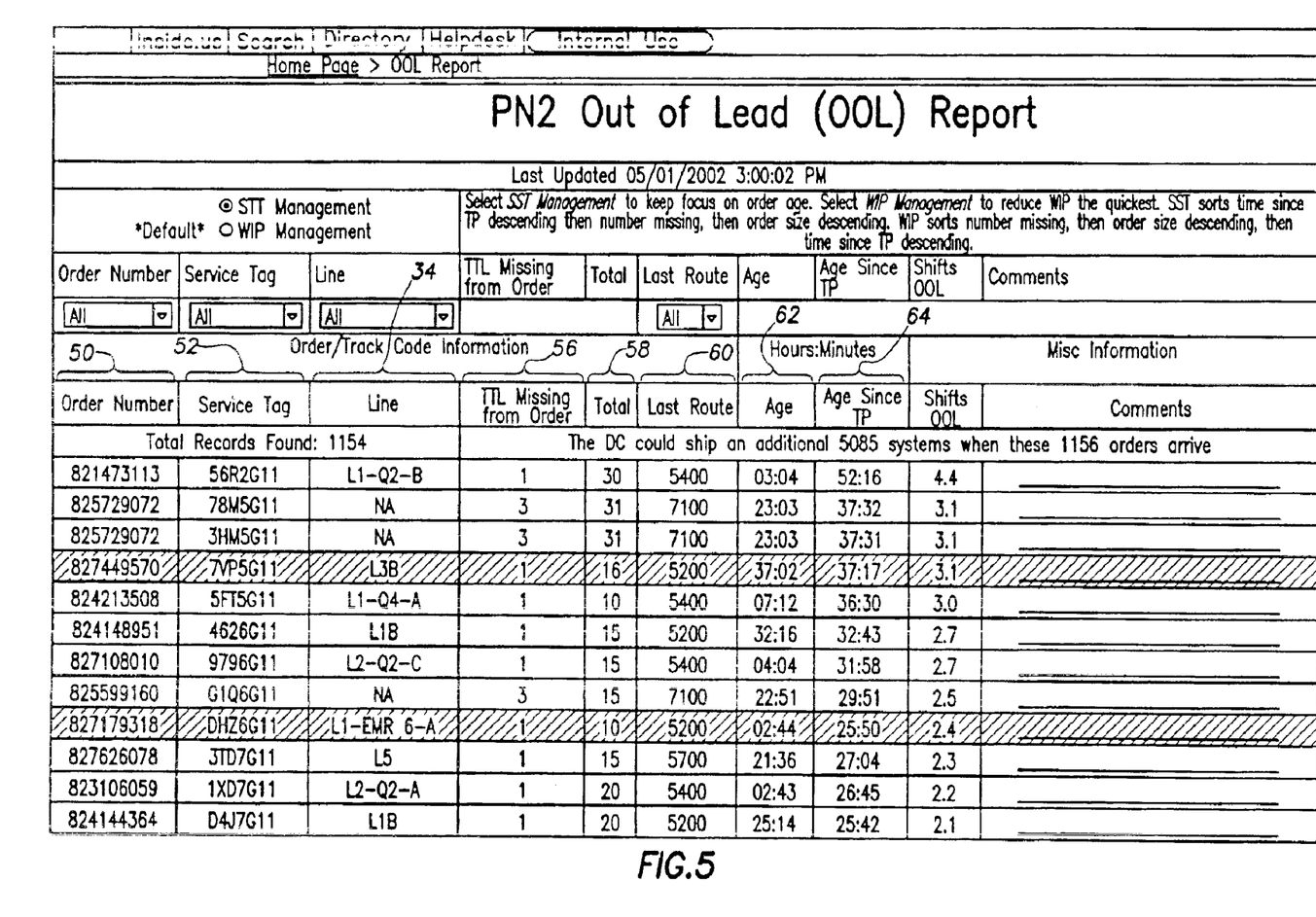
FIG. 5 is a displayed page of data that has been collected and sorted according to the flow diagram of FIG. 4.

Shown in FIG. 5 is a set of data that has been sorted according to the flow diagram of FIG. 4. Although columns 50–64 are present in the table of FIG. 5, as was the case in the table of FIG. 3, the data shown in the remainder of the table is different. First, the oldest order, as indicated by the highest number in the column "Age Since TP," or the cumulative order age, has the highest priority. As shown in FIG. 5, data record "821473113" has the highest sorting priority because it is the oldest order as judged by its cumulative order age. Next, the data records or orders are sorted on an ascending basis according to the number of units missing from the order. The number of units missing from the data record or order is shown in column 56. Finally, the data records or orders are sorted according to the total size of the orders on a descending basis. The order size is shown in column 58.

The technique described in the present disclosure permits the presentation of data concerning the status of the manufacturing and shipping facilities on a real-time basis. This data can be viewed on a real-time basis by those personnel responsible for the manufacturing and shipping facilities. The optimization process of the present disclosure sorts the orders to identify those unmanufactured units that have the greatest effect on the throughput of the manufacturing process. Orders are sorted on a priority basis to identify those orders that have, as a first sorting priority, the fewest number of incomplete units, and, as a second sorting priority, the largest number of total units in the order. Once the orders are sorted according to the disclosed sorting scheme, the records having the highest priority and the greatest effect on the throughput of the manufacturing and shipping process are identified. In addition, individual unmanufactured units within these orders are identified. Once identified, these unmanufactured units can be handled by the manufacturing facility so that he manufacturing of these units is completed quickly and the entire lot of the order can be shipped as a whole to the customer.

It should be recognized that the method described in the present disclosure is not limited to the manufacture of computer systems. Rather, the techniques described herein may be applied with equal effectiveness to a manufacturing process for any item.

Although the present disclosure has been described in detail, it should be understood that various changes, substitutions, and alterations can be made hereto without departing from the spirit and the scope of the invention as defined by the appended claims.

What is claimed is:

1. A method for completing orders in a manufacturing facility, wherein each order includes a number of units, comprising the steps of:
   collecting data concerning orders;
   identifying for each order the number of units for which manufacturing is not complete;
   identifying for each order the number of units in the order;
   identifying for each order the age of the order; and
   sorting the orders, wherein the sorting process assigns highest priority among the orders to the order having the fewest number of units for which manufacturing is not complete.

2. The method for identifying incomplete orders in a manufacturing facility of claim 1, further comprising the step of displaying the sorted orders.

3. The method for identifying incomplete orders in a manufacturing facility of claim 2, wherein the display of each order includes a display of the unique order number for the order, the number of incomplete units in the order, the number of units in the order, and the age of the order.

4. The method for identifying incomplete orders in a manufacturing facility of claim 1, wherein the step of collecting data concerning orders comprises the steps of,
   retrieving a list of all orders from a database of all orders in a shipping facility;
   removing from the list all complete orders; and
   retrieving from a manufacturing database data on the orders that remain on the list of orders retrieved from the shipping facility.

5. The method for identifying incomplete orders in a manufacturing facility of claim 3, further comprising the steps of,
   identifying at least one manufacturing line of each order; and
   displaying the manufacturing line of each order in the display of the sorted orders.

6. The method for identifying incomplete orders in a manufacturing facility of claim 5, further comprising the steps of,
   identifying at least one manufacturing location of each unit in the manufacturing line; and
   displaying the location of each unit in the manufacturing line in the display of sorted orders.

7. The method for identifying incomplete orders in a manufacturing facility of claim 6, further comprising the steps of,
   identifying the elapsed time of at least one unit in the manufacturing location in the manufacturing line; and
   displaying the elapsed time of at least one unit in the manufacturing location in the manufacturing line.

8. A method for synchronizing the throughput of a manufacturing facility with the throughput of a shipping facility, comprising the steps of:
   collecting data concerning the unshipped orders in a shipping facility;
   collecting data concerning the incomplete orders in the manufacturing facility;
   merging and sorting the data concerning the unshipped orders in a shipping facility with the data concerning the incomplete orders in the manufacturing facility such that the orders are sorted for display such that the orders having the fewest number of incomplete units having highest display priority; and
   displaying the merged and sorted data.

9. The method for synchronizing the throughput of a manufacturing facility with the throughput of a shipping facility of claim 8, wherein the data is merged according to a unique order number assigned to each order.

10. The method for synchronizing the throughput of a manufacturing facility with the throughput of a shipping facility of claim 8, wherein the collected and displayed data includes, for each order, the manufacturing line of at least one of the units of the order.

11. The method for synchronizing the throughput of a manufacturing facility with the throughput of a shipping facility of claim 10, wherein the collected and displayed data includes, for each order, the location on the manufacturing line of at least one unit.

12. The method for synchronizing the throughput of a manufacturing facility with the throughput of a shipping facility of claim 11, wherein the collected and displayed data includes, for each order, the elapsed time of at least one unit in the location on the manufacturing line.

13. The method for synchronizing the throughput of a manufacturing facility with the throughput of a shipping facility of claim 8, further comprising the step of continually executing the steps of collecting data, merging and sorting the data, and displaying the data such that the data is displayed on a real-time basis.

14. The method for synchronizing the throughput of a manufacturing facility with the throughput of a shipping facility of claim 8, wherein the step of collecting data concerning the unshipped orders in a shipping facility comprises the step of collecting data from a database associated with a shipping facility; and wherein the step of collecting data concerning the incomplete orders in the manufacturing facility comprises the step of collecting data from a database associated with a manufacturing facility.

15. A method for managing the throughput of a manufacturing and shipping process, comprising the steps of:

collecting data concerning partially complete orders;

establishing a data record for each order;

sorting the data records such that the data records are sorted for display such that the orders having the fewest number of incomplete units have highest display priority; and displaying the sorted data on a real-time basis.

16. The method for managing the throughput of a manufacturing and shipping process of claim 15, wherein the step of collecting data concerning partially complete orders comprises the steps of, identifying all orders for which at least one complete unit is located in the shipping facility; and collecting data from the manufacturing facility for those orders for which at least one complete unit is located in the shipping facility.

17. The method for managing the throughput of a manufacturing and shipping process of claim 15, wherein the display of each data record includes a display of the unique order number for the order, the number of incomplete units in the order, the number of units in the order, and the age of the order.

18. The method for managing the throughput of a manufacturing and shipping process of claim 15, wherein the display of each data record includes a display of at least one manufacturing line of each order.

19. The method for managing the throughput of a manufacturing and shipping process of claim 18, wherein the display of each data record includes a display of at least one manufacturing location for the manufacturing line displayed for each order.

20. The method for managing the throughput of a manufacturing and shipping process of claim 19, wherein the display of each data record includes a display of the elapsed time of the unit in the manufacturing location displayed for the order.

* * * * *